Figure 1:
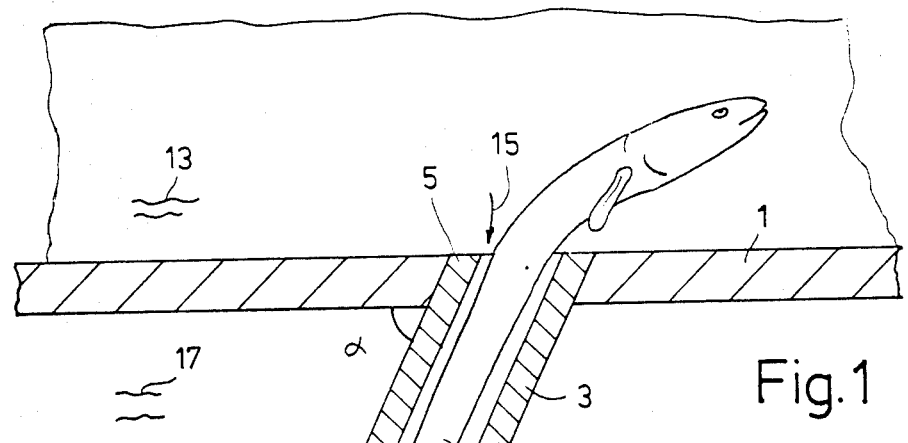

United States Patent [19]

Pohlhausen

[11] Patent Number: 4,489,673
[45] Date of Patent: Dec. 25, 1984

[54] EQUIPMENT FOR THE RAISING OF EELS, CRAYFISH AND OTHER BOTTOM-LIVING MARINE ORGANISMS

[76] Inventor: Henn Pohlhausen, Friedrichstr. 56, Buchholz, Fed. Rep. of Germany

[21] Appl. No.: 492,024
[22] PCT Filed: Sep. 4, 1982
[86] PCT No.: PCT/EP82/00193
§ 371 Date: May 9, 1983
§ 102(e) Date: May 9, 1983
[87] PCT Pub. No.: WO83/00798
PCT Pub. Date: Mar. 17, 1983

[30] Foreign Application Priority Data

Sep. 9, 1981 [DE] Fed. Rep. of Germany ....... 3135653

[51] Int. Cl.³ .............................................. A01K 61/00
[52] U.S. Cl. .................................................... 119/2
[58] Field of Search .................................... 119/2, 3, 4

[56] References Cited

U.S. PATENT DOCUMENTS

| | | | |
|---|---|---|---|
| 2,007,479 | 7/1935 | Salles et al. | 119/4 |
| 3,797,458 | 3/1974 | Day et al. | 119/2 |
| 3,858,554 | 1/1975 | Beaupoil et al. | 119/2 |
| 3,929,100 | 12/1975 | Thomas et al. | 119/2 |

FOREIGN PATENT DOCUMENTS 2033191 5/1980 United Kingdom .................... 119/2

*Primary Examiner*—Hugh R. Chamblee
*Attorney, Agent, or Firm*—Thomas H. Whaley

[57] ABSTRACT

A tank filled with water and appropriate to receive such aquatic organisms, comprises a support bottom (1) under the water surface, presenting on the fresh water side in circulation, shelter holes shaped as pipes (3), wherein the aquatic organisms lives according to their natural way of life. Such shelters (3), adapted to the way of life of eels, have their upper opening (5) orientated in the fresh water stream (13) and extend inclined downwardly. To the contrary, for the breving of crustacea, those aquatic shelters extend horizontally from the fresh water compartment. A water stream (15) passes through such aquatic shelters between the fresh water compartment and the residual water compartment (25); said water stream entrains from the pipes (3) towards the residual water compartment excrements, food remains and other waste. The device may be provided with a heating elements allowing to use for the heating, by means of special bottom arrangements, slightly dirty waste waters as well as very dirty waste waters.

8 Claims, 7 Drawing Figures

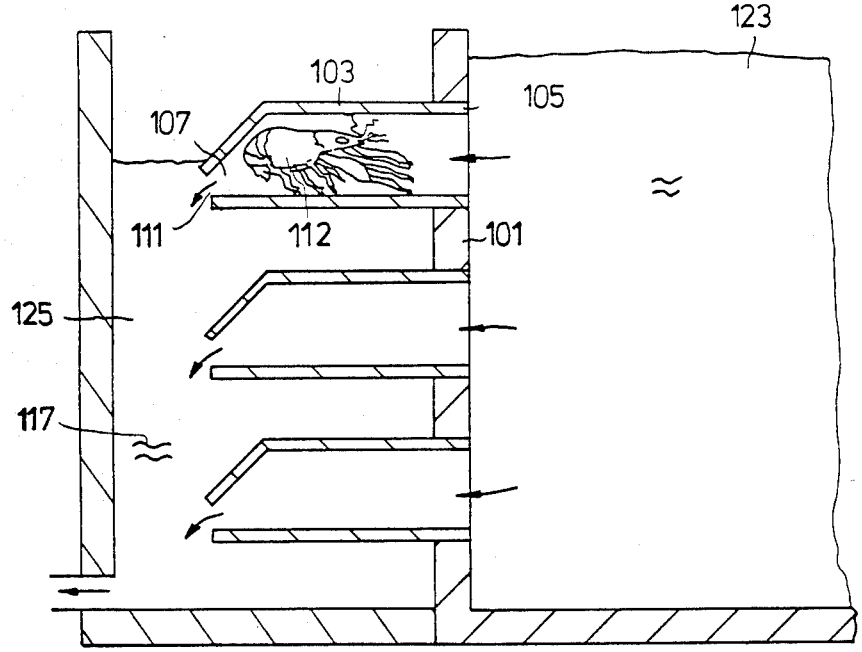
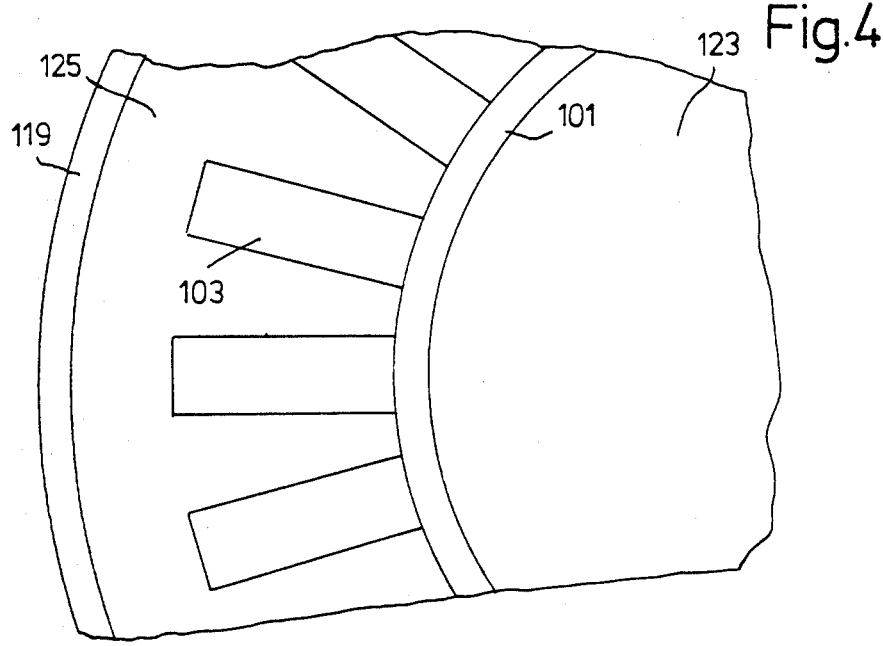

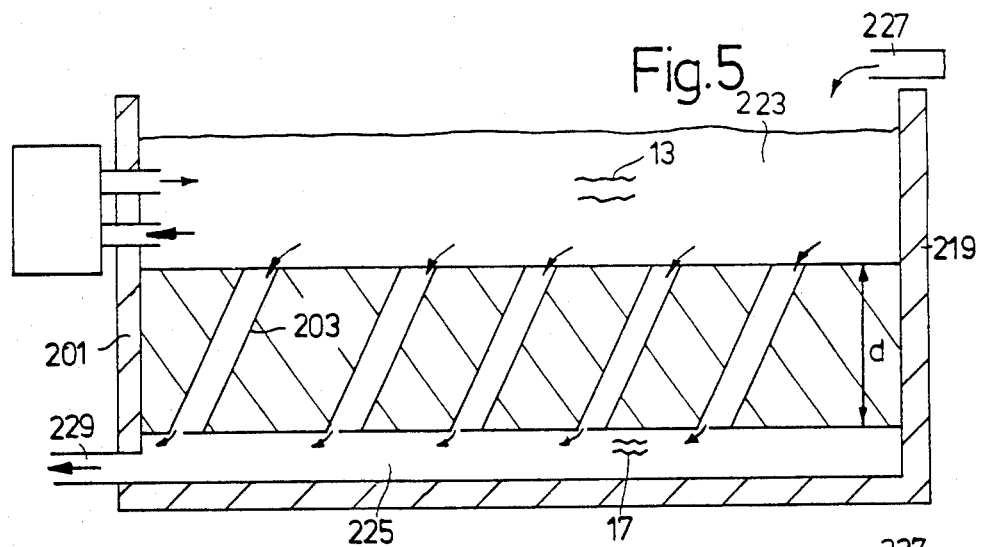
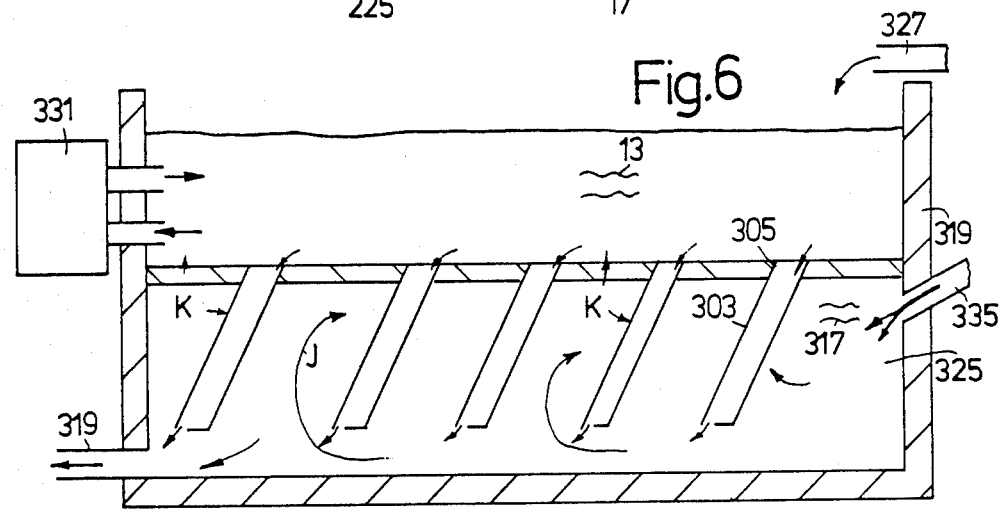
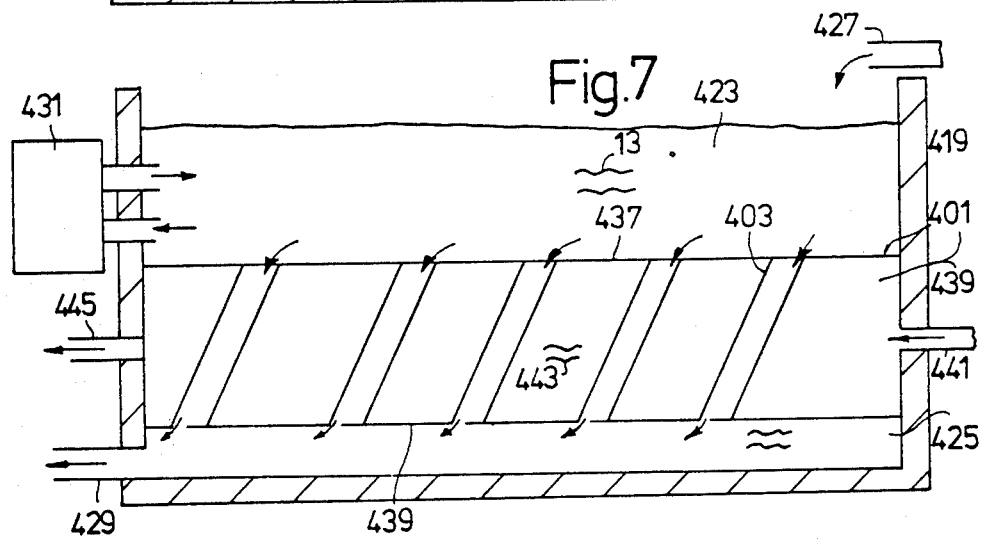

EQUIPMENT FOR THE RAISING OF EELS, CRAYFISH AND OTHER BOTTOM-LIVING MARINE ORGANISMS

The invention relates to an equipment for the raising of eels, crayfish and other cave- and bottom-living marine organisms in a manner appropriate to their habits, comprising a water-filled container for receiving the maring organisms, in which hiding places for the marine organisms are provided below the surface of the water and water flows through said hiding places.

It has been known in commercial warm-water eel cultivation to raise eels, for instance, in longitudinal-flow basins provided with an end drainage screen. However, such longitudinal-flow basins are not suitable, because eels, being bottom-living fish, must continually live at the bottom in a mixture of water, excrements and feed scraps. Cleaning of the basins and in particular of the drainage screen causes severe strain to the fish. It is practically impossible to remove sick and dead animals without having to drain the entire basin (Arbeiten des Deutschen Fischereiverbandes, No. 30, 1980, by H. Kuhlmann, p. 74). A more recent study (Niedersächsische Landesentwicklungsgesellschaft m.b.H., Hanover 1979, entitled "Aalfütterungsanlage-Vorbereitungs-stufe") also does not solve the problem of eel raising. In said publication again flat bottoms with their attendant problems are used, and moreover the water flow rate is too high. The known raising methods result in a relatively low rate of stocking of 15 kg per $m^2$ of the body of water or 37.5 kg per $m^3$ of water for the eel, which requires little oxygen and is therefore resistant (Nileg-Studie, 1979, pp. 6 and 24). In contrast thereto it is possible in case of trout, which live in free water, require considerably more oxygen and are thus more delicate, to obtain rates of stocking of between 100 kg per $m^3$ to 167 kg per $m^3$ (H. Keesen: Aufbau und Funktion einer Züchtungsbatterie mit umlaufendem Wasser für die Aufzucht von Forellensetzlingen; Arbeiten des Deutschen Fischerei-Verbandes, No. 19, 1976). Thus, the much more fastidious trout permits rates of stocking per $m^3$ of water which are 2.5- to 4.5-times as high although one would expect eels to tolerate—as they do when being transported—considerably higher rates of stocking in the raising thereof than trout, because the oxygen requirement of trout is about 3.4-times that of eels. It may therefore be assumed that the accommodation of eels in the known raising plants is not agreeable to the habits of eels and does not permit full development of the eel's production potential.

The papers by Kuhlmann, "Neue Technik zur Haltung and Anfütterung von Glasaalen", Arbeiten des Deutschen Fischereiverbandes, No. 30, 1980, describe a raising equipment in which the eel is lured away from the bottom onto wire frames into the open water. As compared to earlier methods, this new technique permits an improved result of growth increase of up to 50% with a simultaneous higher rate of stocking and better utilization of the water. However, as compared to the rate of stocking in the case of trout, these results are still unsatisfactory.

It is the object of the invention to provide an equipment for raising eel, crayfish and other cave- and bottom-living marine organisms, which, while it permits a high rate of stocking, at all times provides for clean and high-oxygen and, if necessary, warm breathing water.

According to the invention an equipment is provided comprising a supporting base for hiding receptacles adapted to the habits of the marine organisms to be accommodated, and clean water flows through said hiding receptacles, the rear ends of which are constricted to prevent the marine organisms from escaping in the direction of the flow of water.

The invention is defined by claim 1, and the subclaims are directed to the preferred features of the invention.

The receptacles are well adapted to the habits of the marine organisms and ensure raising more free from strain with less danger from diseases and considerably higher rate of stocking which means more efficient use of water.

Living accommodations for eels adapted to the behaviour of the organisms are especially necessary when further raising in enclosures is necessary or desirable, e.g. in order to reduce possible mercury content in eels grown in contaminated bodies of water. This is because raising in enclosures of the prior art as described above has been unsuccessful, and even with success would be too costly.

The hiding receptacles are preferably tubes or of polygonal form, e.g. of honeycomb form, and may be arranged in horizontal, vertical or inclined position.

For the raising of eel the hiding receptacles will be tubes which usually and preferably will extend upwardly at an inclination, wherein the cross-section of the tube is constricted at the lower end. For the raising of crayfish the hiding receptacles will normally and preferably be horizontally disposed tubes which are constricted at the rear end. In either case the high-oxygen clean breathing water flows from the forward head-end of the tubes to the rear or lower constricted tube end. The constrictions are designed such that excrements and feed scraps may exit from the tubes at the rear ends thereof while the marine organisms are retained therein.

In accordance with a further embodiment of the invention the supporting base comprises a plate into which the head ends of the hiding receptacles terminate and on which the hiding receptacles are mounted, and the supporting base separates the freshwater section of the container from the dirty-water section. The supporting base may, for instance, float in the water or it may be secured to the container wall. The supporting base may have any desired shape; this depends on the type of manipulation. Also, supporting bases with various tube sizes may be provided for the different raising stages of eels, crayfish and other marine organisms to be raised.

Most frequently, the eels will stand head-up in the inclined tubes, whereas the crayfish will normally hide in the horizontal tubes. In either case this rest position corresponds to the normal habits of the animals so that raising in a manner agreeable to the animals will be possible.

The hiding receptacles may also be made such that corrugated plates are either disposed so as to rest against one another or are stacked upon one another, thus forming readily disengageable tube systems through which water flows, wherein the rear constrictions are formed by a perforated bottom.

In particular crayfish and eels, but also other cave- and bottom-living marine organisms, may preferably be raised in warm water. In more northern latitudes this involves the provision of warm raising water. This may be achieved by warming the raising water. In this connection, however, warm waste water, which is continually available from various branches of industry, is of particular importance. Apart from completely clean water, there are two different kinds of such waste water. Although one kind is dirty, the dirt content is of a type which readily permits the direct supply of this waste water to a dirty-water section. In that case the supporting base may be formed simply of a plate to which the hiding receptacles are secured and where they terminate with their upper or front ends, respectively. The tube walls will then extend into the dirty-water section while the dirty water flows around the tubes and warms them as desired.

However, there is also warm waste water which is contaminated to such an extent that it is not even suitable for use in drawing off excrements and feed scraps, because there is the risk of contaminants diffusing into the raising water. In that case the supporting base is formed of a hollow body through which the hiding receptacles are extended. Thus, this dirty water is used only for warming the hiding receptacles and exits from the equipment without having been in touch with either freshwater or dirty water in the dirty-water section.

The equipment is operated with a pressure gradient, wherein preferably the freshwater is introduced such that an overpressure is developed relative to the dirty-water section. Therefore the freshwater level should be higher than the water level in the dirty-water section.

Figure 2:
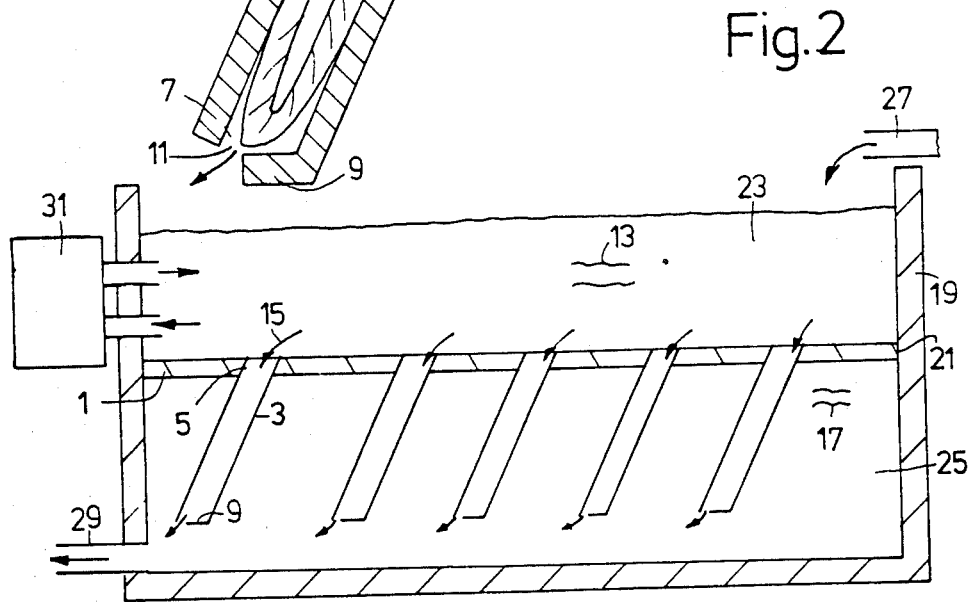

The invention will be described in detail with reference to the embodiments thereof illustrated diagrammatically in the drawings in which FIG. 1 illustrates an element of apparatus for eel raising with an inclined hiding tube, FIG. 2 illustrates apparatus suitable for raising eels in accordance with FIG. 1, FIG. 3 is an elevational view in vertical cross section of a portion of an apparatus suitable for crayfish, FIG. 4 is a fragmentary plan view of an equipment for raising crayfish according to FIG. 3, FIG. 5 illustrates an embodiment of the eel raising equipment including a supporting base formed as a solid body, FIG. 6 illustrates eel raising equipment including dirty-water supply to the dirty-water section, the dirt content of the water being such that it is suitable for drawing off feed scraps and excrements, and FIG. 7 illustrates eel raising equipment in which the waste water used for warming the hiding tubes is contaminated to such an extent that it is not even suitable for drawing off feed scraps and excrements.

FIG. 1 shows an equipment for the raising of eels or other bottom-living marine organisms which have a tendency or habit of living in tubes. The equipment comprises a supporting base 1 in which a multiplicity of hiding tubes 3 is secured. The hiding tubes are fixed with their head ends 5 at a respective suitable angle ($\alpha = 0 - 90°$) with respect to the horizontal supporting base. The rear ends 7 are constricted by bending an edge portion 9 or the like such that liquid as well as feed scraps and excrements may be drawn off through the remaining opening 11 while an eel 12 may not escape therefrom.

The eels are cultivated such that freshwater 13 is supplied above the supporting base 1. This freshwater flows in the direction of an arrow 15 through the hiding tube 3 and exits therefrom beneath the supporting base 1 at the opening 11, for instance by developing a predetermined negative pressure in the water 17 beneath the supporting base 1. Excretion products and water loaded with other contaminants such as feed scraps are thus removed through the opening 11. Thus the eel 12 is always provided with clean breathing water.

FIG. 2 shows a container 19 having a supporting base 1 disposed therein. The edges 21 of said supporting base 1 are contiguous with the container 19 so that a freshwater section 23 containing freshwater 13 will be formed above the supporting base 1, while below the supporting base a dirty-water section 25 containing dirty water 17 is formed. The freshwater 13 is introduced via an inlet 27. Since the dirty water is removed through a passageway 29, suction will be developed permitting the fresh-water to pass through the hiding tubes 3. In addition, a water circulating means 31 is provided which circulates and aerates the water in the freshwater section 23.

As an example for the possible raising of other bottom-living marine organisms FIG. 3 shows an equipment for the raising of crayfish. A supporting base 101 is provided into which hiding tubes 103 are inserted. The head ends 105 of the hiding tubes 103 are secured in the supporting base 101 and open into the freshwater section 123. The rear ends of the hiding tubes 103 are constricted such that it is possible, on the one hand, to drain off water contaminated by excrements and feed scraps while, on the other hand, crayfish 112 sitting inside the hiding tubes may not escape therefrom. The freshwater which is contaminated by excrements and feed scraps exits from the hiding tubes 103 through the opening 111, because the water 117 in the dirty-water section 125 is at a negative pressure. Thus, freshwater continually flows through the hiding tubes 103, and the crayfish 112 inside the hiding tubes 103 may live in an environment which corresponds to their habits and is therefore agreeable to them.

The plan view of FIG. 4 shows an example of an equipment for raising brook crayfish (Astacus) or king crayfish (Pacifastacus). Here, the supporting base 101 is in the form of a pipe, and the freshwater section 123 is provided inside said pipe. The hiding tubes 103 extend from the pipe-like supporting base 101 outwardly into the dirty-water section 125, which is surrounded by a tubular shell 119. Of course, different structures of the equipment for the raising of crayfish may be contemplated.

FIG. 5 shows modification of the equipment for raising eels comprising a supporting base 201 which may be a solid base, e.g. of foamed synthetic material. This supporting base 201 has a thickness d which is so designed that the hiding tubes 3 for eels as represented in FIG. 1 may be completely received within the supporting base 201.

The supporting base 201 is arranged within a water container 219 to which freshwater 13 is introduced above the supporting base 201 via a conduit 227 Here again, a freshwater section 223 is formed above the supporting base 201 while a dirty-water section 225 is formed beneath the same. The freshwater passing through the hiding tubes 203 is drawn into the dirty-water section 225, entraining contaminants such as excrements and feed scraps. The negative pressure in the dirty-water section 225 may be developed by sucking the dirty water 17 from the equipment via a connecting piece 229.

In industrial plants warm waste water is frequently available which is introduced into discharge pipes without being utilized. In more northern latitudes normal freshwater is relatively cold and therefore does not have the optimum temperature desirable for eels, crayfish or other bottom-living organisms to be raised which normally live in warmer regions, so that, for instance, the growth increase is slower than at the optimum temperature. It is possible to use warm industrial waste water for raising the temperature of both the freshwater and the hiding tubes to a level which is agreeable to the animals. FIG. 6 shows an embodiment which provides for the use of warm industrial waste water, wherein this warm industrial waste water is not suitable as freshwater but is quite suitable for the removal of excrements, feed scraps or other contaminants. In such a case there is provided inside the water container 319 a supporting base 301 having a structure similar to the supporting base 1 of FIGS. 1 and 2. Thus, hiding tubes 303 are mounted in inclined position with their head ends 305 on the supporting base 301. Above the supporting base 301 freshwater 13 is provided which is circulated in a circulating means 331. The freshwater is supplied via an inlet conduit 327.

Dirty water 317 is introduced into the dirty-water section 325 via a separate inlet conduit 335. This dirty water is warm industrial waste water which may be supplied, for instance, from dairies or the like. This warm industrial waste water warms the supporting base 301 and thus the freshwater 13 and the hiding tubes 303. The heat transmission is indicated by arrows K. Thereby the entire equipment for the raising of eels is warmed to a water temperature which is optimum for the animals; of course, the same applies to the raising of crayfish.

As in the previously described embodiments, the dirty water is either sucked off or discharged through a dirty-water connection 319. The circulation of the introduced warm dirty water within the dirty-water section is indicated by arrows J.

The dirty water used in the equipment according to FIG. 6 has a degree of contamination which makes it possible to subject it together with the excrements to a normal sewage treatment. However, there is also warm dirty water which is so highly contaminated that it must not be brought into contact with fish or with a fish raising plant at all. This type of dirty water may, however, still be used in the equipment according to FIG. 7. Here, inside the water container 419 there is disposed a supporting base 401 through which the hiding tubes 403 extend from the freshwater side 437 to the dirty-water side 439 in the already described inclined position. Freshwater 13 flows into the freshwater section 423 through an inlet conduit 427. A circulating means 431 circulates the freshwater within the freshwater section 423. Beneath the supporting base 401 the dirty-water section 425 is provided, which is connected to a discharge suction pipe 429. Thus the freshwater 13 again passes through the hiding tubes 403 from the top to the bottom thereof and carries away excrements, feed scraps and other contaminants into the dirty-water section 425, whence they are discharged via the suction pipe 429. The interior 439 of the supporting base 401 is in communication with a dirty-water conduit 441, through which warm dirty water, which is quite unsuitable for fish, flows into the interior 439, whereby the interior is warmed. The dirty water 443, which is unsuitable for fish, leaves the supporting base 401 via a discharge conduit 445.

I claim:

1. Apparatus for raising marine organisms comprising eels, crayfish, and similar cave- or bottom-living marine organisms which comprises a container adapted to hold water suitable for raising said marine organisms, a plurality of substantially tubular hiding receptacles suitable as a habitat for said organisms, a supporting base for said receptacles dividing said container into a freshwater section and a dirty-water section, said receptacles extending through and secured to said supporting base and opening at one end into the freshwater section of said container and opening at the other end into the dirty-water section of said container, each of said receptacles having a constriction at the other end thereof sufficient to prevent the escape of said marine organisms therethrough, means for supplying freshwater to said freshwater section of said container, and means for drawing off water containing wastes from the constricted ends of said receptacles into said dirty-water section of said container.

2. Apparatus according to claim 1, characterized in that the hiding receptacles are formed by corrugated plates either stacked upon each other or arranged to rest against each other, whereby tubes are formed, said receptacles being closed at their rear ends by a perforated bottom.

3. Apparatus according to claim 1 wherein said hiding receptacles are tubes of a size suitable for eels, said tubes opening into the freshwater section of said container through a substantially horizontal supporting base for said receptacles at an angle thereto.

4. Apparatus according to claim 1 wherein said hiding receptacles are tubes of a size suitable for crayfish, and said tubes are positioned horizontally opening into the freshwater section of said container through a substantially vertical supporting base.

5. Apparatus according to claim 1 wherein said hiding receptacles are surrounded by a foamed solid material.

6. Apparatus according to claim 1 wherein the area surrounding the hiding receptacles is adapted to contain water and including means for supplying warming water to the area surrounding said hiding receptacles.

7. Apparatus according to claim 6 wherein said area surrounding said receptacles is isolated from the ends of said receptacles whereby water containing wastes from said receptacles is discharged therefrom without coming into direct contact with warming water surrounding the receptacles.

8. Apparatus according to claim 6 wherein the constricted ends of said receptacles open into the area surrounding the receptacles and including means for creating a pressure gradient between the freshwater section of said container and the warming water in the area surrounding the receptacles causing water to flow through the receptacles from the freshwater section of said container into the warming water in the area surrounding the receptacles.

* * * * *